United States Patent
Press et al.

(10) Patent No.: US 10,742,434 B2
(45) Date of Patent: Aug. 11, 2020

(54) EVENT-BASED CONTENT OBJECT COLLABORATION

(71) Applicant: Box, Inc., Redwood City, CA (US)

(72) Inventors: Jeremy David Press, San Francisco, CA (US); Wenbo Yu, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 296 days.

(21) Appl. No.: 15/607,127

(22) Filed: May 26, 2017

(65) Prior Publication Data

US 2018/0343134 A1 Nov. 29, 2018

(51) Int. Cl.
| | |
|---|---|
| G06F 3/048 | (2013.01) |
| H04L 12/18 | (2006.01) |
| H04L 29/06 | (2006.01) |
| G06F 40/197 | (2020.01) |
| G06Q 10/10 | (2012.01) |
| G06F 40/103 | (2020.01) |
| G06F 40/166 | (2020.01) |

(52) U.S. Cl.
CPC ........ H04L 12/1827 (2013.01); G06F 40/197 (2020.01); H04L 65/403 (2013.01); H04L 65/4015 (2013.01); G06F 40/103 (2020.01); G06F 40/166 (2020.01); G06Q 10/101 (2013.01)

(58) Field of Classification Search
None
See application file for complete search history.

(56) References Cited

U.S. PATENT DOCUMENTS

| 7,793,301 B2 * | 9/2010 | Bhat | H04L 12/66 709/223 |
| 2008/0126943 A1 * | 5/2008 | Parasnis | G06Q 10/10 715/730 |
| 2009/0249222 A1 * | 10/2009 | Schmidt | H04N 21/2368 715/751 |

(Continued)

OTHER PUBLICATIONS

"NW.js and Electron.js: Web Technology on the Desktop", URL: http://www.tivix.com/blog/nwjs-and-electronjs-web-technology-desktop/, May 13, 2015.

(Continued)

Primary Examiner — Hua Lu
(74) Attorney, Agent, or Firm — Vista IP Law Group, LLP

(57) ABSTRACT

Live presentation sessions are carried out by broadcasting non-image events of a presenter, which non-image events are subsequently performed over instances of shared content that are stored at user devices of a set of audience members. A live presentation can be initiated when two or more users that are authorized to access a content object stored in a shared content repository are authenticated. The presentation session proceeds with delivery of individual instances of the content object to each of the user devices corresponding to a presenter's user device and an audience member's user device. Upon detection of presentation actions that occur over one of the instances of the content object, the presentation actions are codified into a non-image event object, which is then sent to the audience member's user device. Continuing presentation actions are carried-out over respective instances of the content object at the user device of the audience member.

20 Claims, 13 Drawing Sheets

(56) References Cited

U.S. PATENT DOCUMENTS

| | | | |
|---|---|---|---|
| 2011/0249954 A1* | 10/2011 | Meek | H04N 5/772 |
| | | | 386/239 |
| 2014/0067957 A1* | 3/2014 | Yamada | H04L 12/1822 |
| | | | 709/204 |
| 2014/0222919 A1* | 8/2014 | Nysetvold | G06F 30/00 |
| | | | 709/204 |
| 2015/0206446 A1* | 7/2015 | Gupta | G06F 40/171 |
| | | | 434/362 |
| 2016/0283456 A1* | 9/2016 | Sitrick | G06F 3/04842 |
| 2016/0291921 A1* | 10/2016 | Miller | H04N 21/4788 |
| 2017/0185268 A1* | 6/2017 | Zeng | G06F 3/04883 |
| 2019/0147402 A1* | 5/2019 | Sitrick | G06F 9/542 |
| | | | 705/301 |

OTHER PUBLICATIONS

"Operational transformation", URL: https://en.wikipedia.org/wiki/Operational_transformation, Jul. 29, 2016.

"GoToMeeting", URL: https://en.wikipedia.org/wiki/GoToMeeting, Mar. 28, 2017.

"SlideShare", URL: https://en.wikipedia.org/wiki/SlideShare, Mar. 30, 2017.

"WebEx", URL: https://en.wikipedia.org/wiki/WebEx, Feb. 11, 2017.

* cited by examiner

EVENT-BASED CONTENT OBJECT COLLABORATION

FIELD

This disclosure relates to shared content management, and more particularly to techniques for managing event-based content object presentations.

BACKGROUND

The advent of computer-readable content objects (e.g., text files, presentations, spreadsheets, mixed text and graphics documents, audio files, etc.) has led to the development of various techniques for sharing such objects. One such technique involves merely attaching the objects to an email and sending them to others. Techniques that attach shared documents or other objects to an email run the risk of divergence due to multiple un-synchronized modifications of different instances of the shared objects (e.g., since there are many copies of such objects). Improved, but still deficient alternative sharing techniques involve live presentations where a live presentation of a particular content object is shared with a geographically dispersed online audience. In this case, a presenter navigates through a presentation object on the presenter's user device, while a remote set of participants (e.g., the audience) follow along on their respective user devices by seeing the presenter's actions over the presentation object. Such techniques involve sending a series of images to the audience members so the audience members can follow along by seeing the series of images change as the presenter navigates through the presentation object. Audio commentary from the presenter to the audience often accompanies the series of images.

Unfortunately, legacy approaches that capture a series of still images of the presenter's view of the presentation object and distribute it in real time to participants for viewing at their user devices are deficient, at least in that the sending and processing of the images is resource intensive, and sometimes the received images suffer from poor image quality (e.g., due to poor or unpredictable network bandwidth availability). Strictly as one example of the wasteful resource usage, many sequences of images/snapshots are distributed to all audience members during even simple navigation (e.g., page down, zoom in, change pointer, etc.). This wastefulness increases with the size of the collaboration group. Still more, wasteful resource consumption will continue to grow commensurate with greater and greater adoption of online sharing of larger and larger corpora of shared documents. What is needed is a technological solution that facilitates efficient live presentation of content objects to multiple audience members.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure describes techniques used in systems, methods, and in computer program products for event-based content object presentation, which techniques advance the relevant technologies to address technological issues with legacy approaches. More specifically, the present disclosure describes techniques used in systems, methods, and in computer program products for real-time content object presentation using non-image events. Certain embodiments are directed to technological solutions for exchanging non-image events between presentation participants that are applied to user-specific instances of a shared content object. As used herein, a content object is any item that can be stored in a persistent storage location. In some cases, a content object is a file. In some cases, a content object is a collection of files, any of which can become the subject of a live presentation to multiple audience members.

The disclosed embodiments modify and improve over legacy approaches. In particular, the herein-disclosed techniques provide technical solutions that address the technical problems attendant to efficient live presentation of content objects to multiple audience members. Such technical solutions relate to improvements in computer functionality. Various applications of the herein-disclosed improvements in computer functionality serve to greatly reduce the demand for computer memory, reduce the demand for computer processing power, and reduce network bandwidth use. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of human-machine interface as well as advances in various technical fields related to collaboration systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
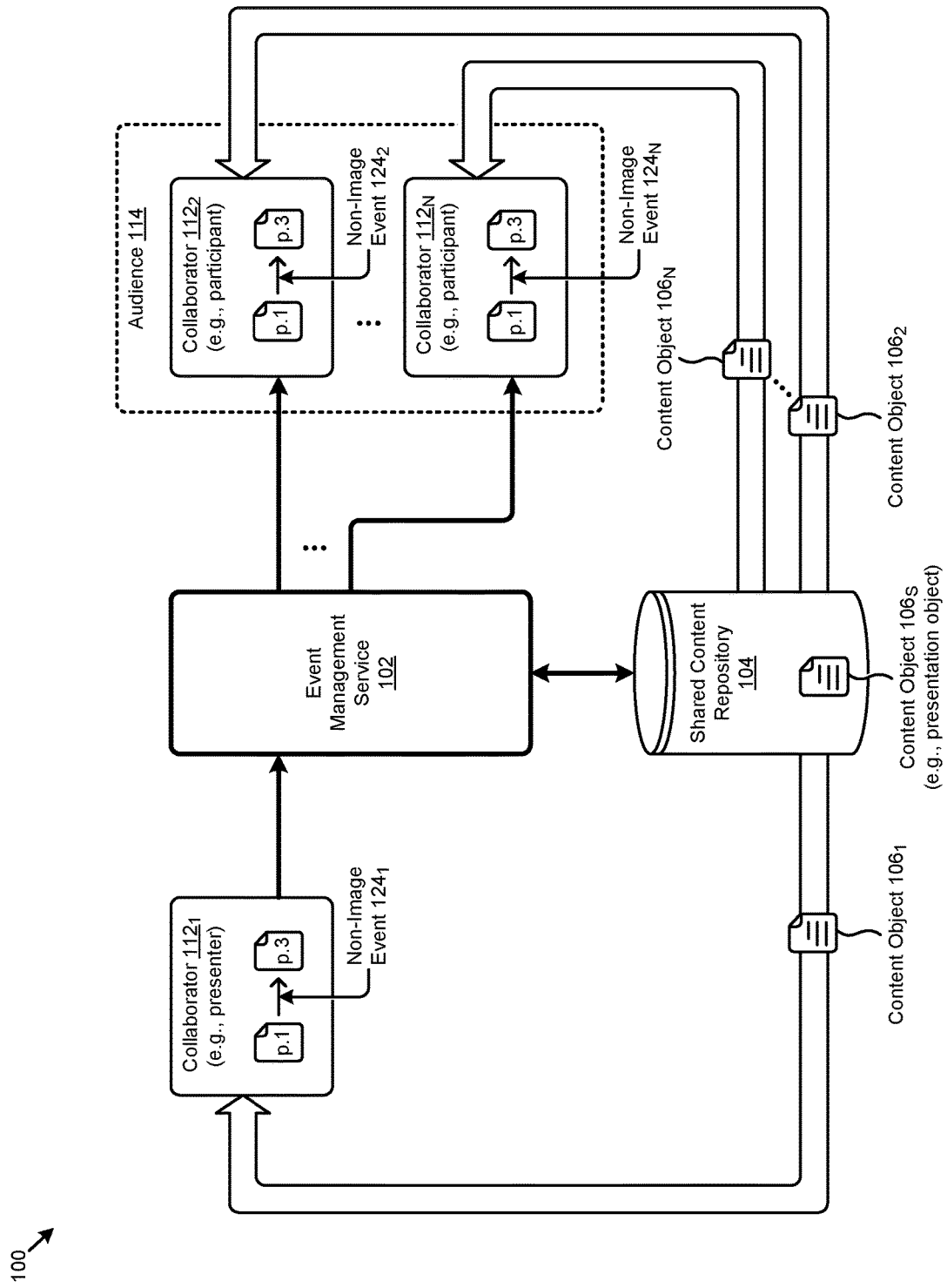
FIG. 1 is a diagram that depicts implementation techniques pertaining to real-time content object presentation using non-image events, according to an embodiment.

Embodiments in accordance with the present disclosure address the problem of facilitating efficient live presentations or other collaboration over a shared content object. Some techniques are directed to approaches for exchanging non-image events between presentation session members that are applied to user-specific instances of a shared content object at user-specific user devices. The accompanying figures and discussions herein present example environments, systems, methods, and computer program products for real-time content object presentation using non-image events.

Overview

Disclosed herein are techniques for exchanging non-image events between presenter(s) and audience member(s) in the context of a guided presentation over a shared document. Non-image events are applied to respective instances of the content object at the audience members' display device to facilitate a live presentation of the content object. In certain embodiments, two or more presentation participants (e.g., collaborators) log in to a shared content repository comprising a content object (e.g., presentation object) they are authorized to access. An instance of the content object is delivered to each of the presentation participants for viewing on their user devices. Certain non-image events occurring at any one of the content object instances are detected and broadcast to the other participants. For example, actions performed by a presenter to navigate from slide 1 to slide 3 of a presentation document can invoke a "pagerendered=3" event that is detected and delivered to each of the other participants to invoke a "pagerendered=3" operation (e.g., display slide 3) at each of the audience members' respective instance of the presentation document.

The exchange (e.g., broadcast) of the non-image events facilitates a real-time (e.g., "live") observation of the effect of the initiating event at each of the user devices of the participants. In certain embodiments, any participant can request to be a presenter. In certain embodiments, a presenter can issue a request to specific users to join a presentation. In certain embodiments, users can elect to view or not view a presentation. In certain embodiments, the non-image event object can be derived from and/or applied to a native application (e.g., used to view or edit the local instance of the content object) operating on a user device. In some embodiments, and as shown in several of the figures, a user might have the capability to edit a local instance of the content object and/or to perform various document manipulation operations over a shared object. As such, users are labeled as collaborators.

The aforementioned document manipulation operations might include viewing operations. For example, various types of viewing operations are used to manipulate the viewable portion or listening portion of a shared content object. More specifically, various types of viewing operations can be applied to a shared content object to "move" to a particular page or location, or to "scroll" through to a particular area. In some cases the aforementioned document manipulation operations might include editing operations. Various types of editing operations can be applied to a shared content item and stored persistently. More specifically, various types of editing operations can be applied to a shared content object to add or delete comments on or near a particular page or location, or to "highlight" a particular area of a shared content object. In some cases the results of the editing operations can be persistently stored.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 is a diagram that depicts implementation techniques 100 pertaining to real-time content object presentation using non-image events. As an option, one or more variations of implementation techniques 100 or any aspect thereof may be implemented in the context of the architecture and functionality of the embodiments described herein. The implementation techniques 100 or any aspect thereof may be implemented in any environment.

The diagram shown in FIG. 1 is merely one example representation of the herein disclosed techniques that facilitate real-time content object presentation using non-image events. As shown, a set of collaborators (e.g., collaborator $112_1$, collaborator $112_2$, . . . , collaborator $112_N$) might desire to collaborate on a content object $106_S$ stored in a shared content repository 104. For example, a user (e.g., collaborator $112_1$) can take on the role of a presenter to present content object $106_S$ (e.g., presentation object) to an audience 114 comprising viewing participants. Legacy approaches to facilitating the presentation of content object $106_S$ often capture a series of still images of the presenter's view of the presentation object and distribute it in real-time to the user devices of the viewing participants. This approach is deficient at least in that the sending and processing of the images is resource intensive, and sometimes the received images suffer from poor image quality (e.g., due to poor or unpredictable network bandwidth availability).

The herein disclosed techniques address these and/or other deficiencies, in part, by exchanging non-image events between the participants, which non-image events are applied to respective participant-specific instances of content object $106_S$. Non-image events, as used herein, comprise a set of descriptors and associated parameters that characterize certain operations pertaining to a particular content object. The operations may vary depending on the type of content object. For example, media files might have a "play" event or a "pause" event, while document files might have a "pagerendered" event or a "pagefocus" event.

The "non-image" qualifier does not eliminate the possibility that events can include parameters or actions that pertain to or refer to various types of images (e.g., still image, snapshot, bitmap, etc.). Rather, the non-image events as used herein refer to the specification or codification of events that had occurred over, or can be taken over any type of content object, possibly including content objects that are images and/or content objects that include images. In certain embodiments, such as is shown in FIG. 1, such techniques can be implemented in an event management service 102. Specifically, event management service 102 can interact with shared content repository 104 to deliver instances of content object $106_S$ (e.g., content object $106_1$, content object $106_2$, . . . , content object $106_N$) to each of the user devices that are participating in a presentation pertaining to a particular shared content object $106_S$. Actions by any one of the users can invoke certain non-image events that are detected and broadcast to the other users. Specifically, any incoming non-image events invoked by a presenter are received at event management service 102, and a corresponding set of outgoing non-image events are broadcast to the audience members.

For example, actions of the presenter (e.g., collaborator $112_1$) to navigate from slide 1 to slide 3 of a presentation document (e.g., content object $106_1$) can invoke a non-image event $124_1$ that corresponds to a "pagerendered=3" event. A set of non-image events (e.g., non-image event $124_2$, . . . non-image event $124_N$) derived from non-image event $124_1$ is delivered by event management service 102 to each of the other participants to invoke a corresponding "pagerendered=3" operation (e.g., display slide 3) at each of the participants' respective instance of the content object (e.g., content object $106_2$, . . . , content object $106_N$).

In comparison to the earlier mentioned legacy approaches, the herein disclosed techniques serve to reduce the demand for computing, storage, and networking resources by exchanging non-image events—as compared to exchanging a sequence of still images—to facilitate live content object presentations. Specifically, the payload of the non-image events is often significantly less than the payload of the still images, resulting in a reduction of the demand for computing, storage, and networking resources. Further, having an instance of the content object at each of the participants' user devices enhances the user experience. For example, the local instances of the content object facilitate a capability of a user to switch between viewing (e.g., following) the presentation and not viewing the presentation (e.g., to explore another portion of the content object).

Figure 2:
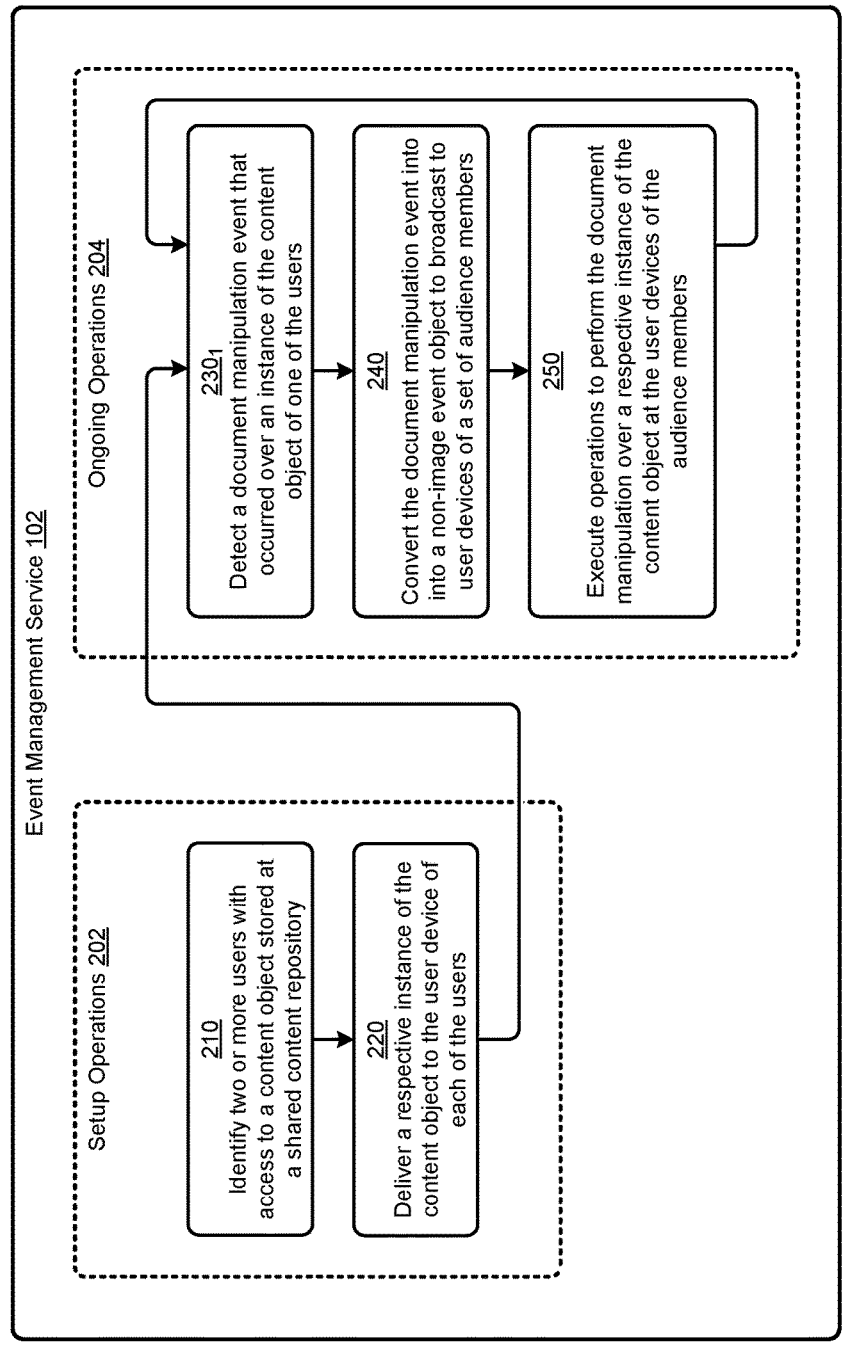
FIG. 2 depicts an event-based object presentation technique as implemented in systems that facilitate real-time content object presentation using non-image events, according to an embodiment.

An embodiment of the herein disclosed techniques as implemented in an event-based object presentation technique is shown and described as pertains to FIG. 2.

FIG. 2 depicts an event-based object presentation technique 200 as implemented in systems that facilitate real-time content object presentation using non-image events. As an option, one or more variations of event-based object presentation technique 200 or any aspect thereof may be implemented in the context of the architecture and functionality of the embodiments described herein. The event-based object presentation technique 200 or any aspect thereof may be implemented in any environment.

The event-based object presentation technique 200 presents one embodiment of certain steps and/or operations that facilitate real-time content object presentation using non-image events. As shown, the steps and/or operations can be grouped in a set of setup operations 202 and a set of ongoing operations 204. In certain embodiments, setup operations 202 and/or ongoing operations 204 might be performed by event management service 102. As illustrated, setup operations 202 of event-based object presentation technique 200 can commence by identifying two or more users with access to a content object stored at a shared content repository (step 210). For example, the users might be authorized to access a certain electronic document (e.g., MICROSOFT Office application file, a text document, a PDF file, a file output by a MICROSOFT application, etc.) stored on a cloud-based shared content management platform. In some cases, such as when implementing the techniques disclosed herein, a respective instance of the content object is delivered to the user device of each of the users (step 220).

Ongoing operations 204 of event-based object presentation technique 200 can commence by detecting a non-image event that occurred over an instance of the content object of one of the users (step $230_1$). For example, a non-image event pertaining to an instance of a presentation object associated with a presenter might be detected. The non-image event is codified into one or more non-image event objects to broadcast to the other users (step 240). In the foregoing example, the detected non-image event from the presenter is codified in a set of non-image event objects that are delivered to presentation audience members. Certain operations to perform the actions pertaining to the non-image event are then executed on a respective instance of the content object associated with each of the other users (step 250). After performing operations pertaining to the non-image event, a loop is traversed to return to steps for detecting further occurrences of non-image events.

Figure 3A:
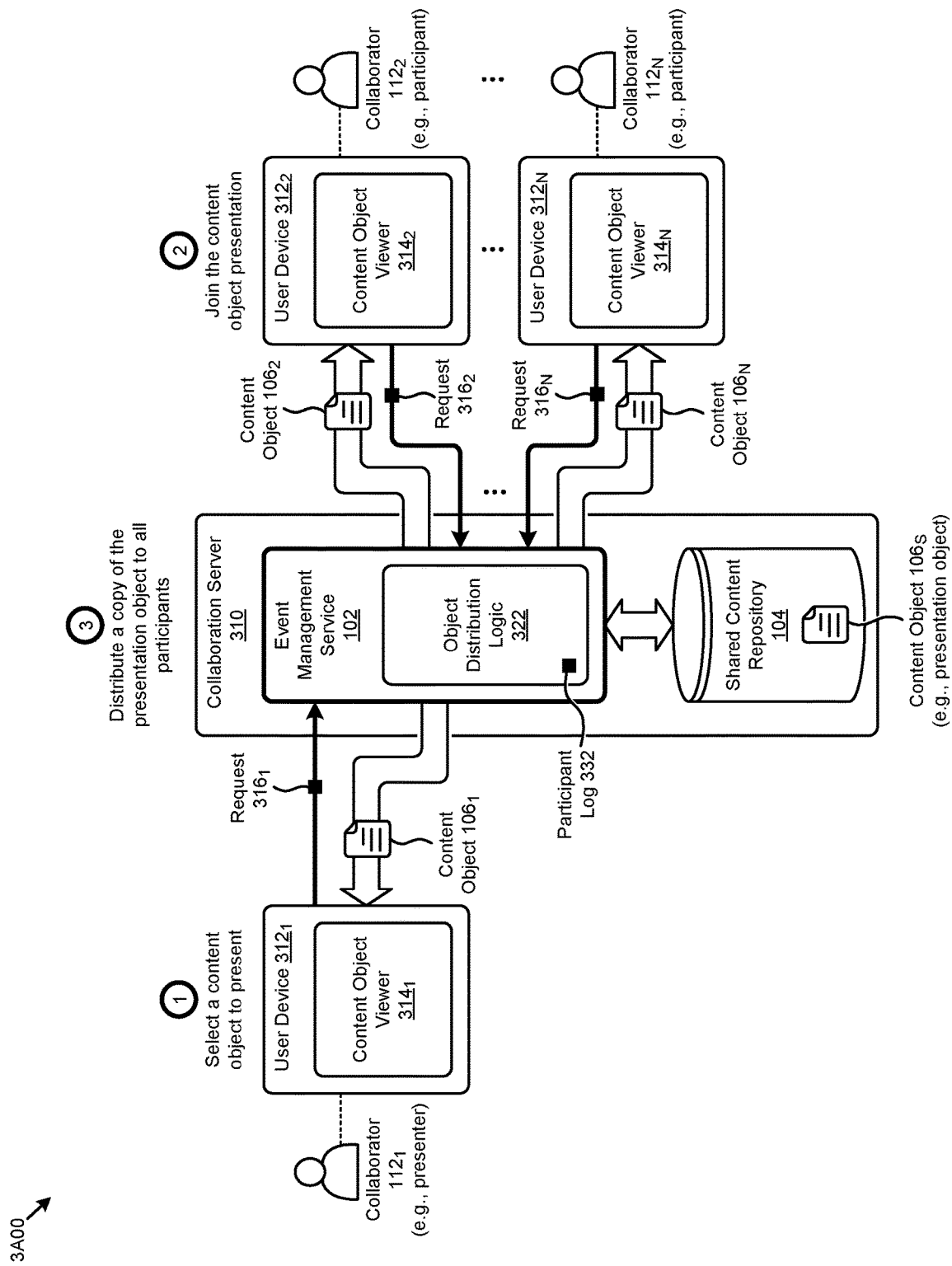
FIG. 3A illustrates a presentation object distribution environment for implementing real-time content object presentation using non-image events, according to an embodiment.

An environment for implementing the herein disclosed techniques to distribute a presentation object is shown and described as pertaining to FIG. 3A.

FIG. 3A illustrates a presentation object distribution environment 3A00 for implementing real-time content object presentation using non-image events. As an option, one or more variations of presentation object distribution environment 3A00 or any aspect thereof may be implemented in the context of the architecture and functionality of the embodiments described herein. The presentation object distribution environment 3A00 or any aspect thereof may be implemented in any scenario.

The embodiment in FIG. 3A depicts a group of users that are each operating respective user devices (e.g., user device $312_1$, user device $312_2$, ..., user device $312_N$) that interfaces with event management service 102. As shown, event management service 102 can be hosted by a collaboration server 310. Collaboration server 310 also manages the shared content repository 104. In the scenario shown in FIG. 3A, a user might select a content object $106_1$ to present to one or more of the other users (operation 1).

In the specific embodiment shown, collaborator $112_1$ might issue a request $316_1$ to event management service 102 to become the presenter of content object $106_S$ (e.g., a presentation object). Other collaborators (e.g., collaborator $112_2$, collaborator $112_N$) can join the presentation of content object $106_S$ (operation 2). Specifically, through interaction with a user interface, the other collaborators might issue requests (e.g., request $316_2$, ..., request $316_N$) to event management service 102 to join the presentation. A set of object distribution logic 322 at event management service 102 analyzes the requests and/or other information to distribute copies of the presentation object to all presentation participants (operation 3). In some cases, a participant log 332 that stores information pertaining to the participants associated with a particular presentation object can be accessed to facilitate the distribution of the presentation object. For example, participant log 332 might indicate that collaborator $112_1$, collaborator $112_2$, and collaborator $112_N$ all desire to participate in the presentation of content object $106_S$. The participant log 332 might also indicate that collaborator $112_1$ is the presenter. As can be observed, instances of content object $106_S$ (e.g., content object $106_1$, content object $106_2$, ..., content object $106_N$) are distributed to the user devices of the collaborators for display in content object viewers (e.g., content object viewer $314_1$, content object viewer $314_2$, ..., content object viewer $314_N$).

With instances of the content object (e.g., presentation object) distributed to the user devices of the presentation participants, non-image events can be applied to the instances to facilitate a live presentation of the content object. Such non-image event processing techniques are presented and discussed as pertains to FIG. 3B.

Figure 3B:
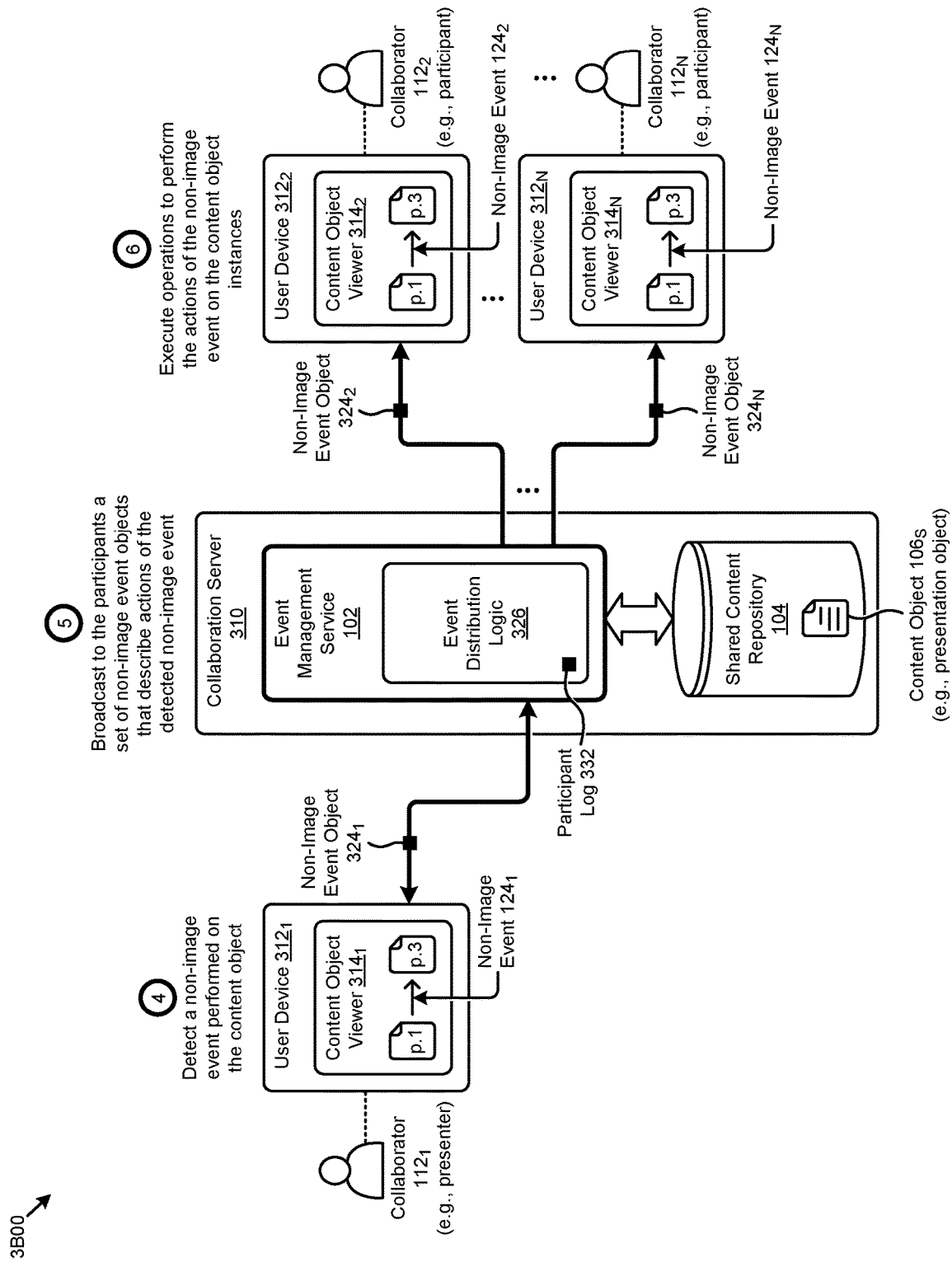
FIG. 3B illustrates a non-image event processing environment for implementing real-time content object presentation using non-image events, according to an embodiment.

FIG. 3B illustrates a non-image event processing environment 3B00 for implementing real-time content object presentation using non-image events. As an option, one or more variations of non-image event processing environment 3B00 or any aspect thereof may be implemented in the context of the architecture and functionality of the embodiments described herein. The non-image event processing environment 3B00 or any aspect thereof may be implemented in any scenario.

As earlier shown and described as pertains to FIG. 3A, collaborator $112_1$ has issued a request to present content object $106_S$ (e.g., the presentation object) and other collaborators (e.g., collaborator $112_2$, ..., collaborator $112_N$) that have indicated a desire to participate in the presentation. According to the herein disclosed techniques, a respective instance (e.g., copy) of the presentation object (e.g., content object $106_S$) is distributed from shared content repository 104 to the user devices (e.g., user device $312_1$, user device $312_2$, ..., user device $312_N$) of the presenter and the participants for display in the content object viewers (e.g., content object viewer $314_1$, content object viewer $314_2$, ..., content object viewer $314_N$) of the user devices. The aforementioned content object viewers include previewer applications, image renderers, web page viewers, etc.

Certain actions taken by a presenter (e.g., collaborator $112_1$) can invoke a non-image event associated with the instance of the content object at the presenter's user device. For example, a non-image event $124_1$ corresponding to a "pagerendered=3" event might be invoked from actions taken by the presenter at content object viewer $314_1$ of user device $312_1$. This non-image event on the content object can be detected (operation 4) and codified in a non-image event object $324_1$ issued to event management service 102 at collaboration server 310. A set of event distribution logic 326 at event management service 102 analyzes the incoming non-image event object (e.g., non-image event object $324_1$) and/or other information to broadcast to the participants a set of non-image event objects that describe actions of the detected non-image event (operation 5).

In some cases, participant log 332 can facilitate the distribution (e.g., broadcast) of the non-image event objects. For example, participant log 332 might indicate that collaborator $112_2$ and collaborator $112_N$ are participants in the presentation of content object $106_S$ and that they should receive non-image events invoked by collaborator $112_1$ (e.g., the presenter). As can be observed, instances of non-image event objects (e.g., non-image event object $324_2$, ..., non-image event object $324_N$) are broadcast from event management service 102 to the participants. Upon receipt of the non-image event objects, certain operations are executed to perform the non-image event on the instances of the content object associated with each participant (operation 6). For example, non-image event $124_2$ is performed at user device $312_2$ of collaborator $112_2$ and non-image event $124_N$ is performed at user device $312_N$ of collaborator $112_N$.

In some cases, the operations executed to perform a particular non-image event can vary due to certain aspects of the environment at which the operations are executed. As one example, operations to navigate to page 10 of a content object might depend on the then-current view (e.g., page 5 or page 8) of the content object. As another example, when various heterogeneous native applications are used by presenters to manage (e.g., view, edit, present, etc.) a content object, the respective operations to carry out a particular event on the content object at each native application may also vary. An example environment comprising a heterogeneous native application that implements the herein disclosed techniques is shown and described as pertains to FIG. 3C.

Figure 3C:
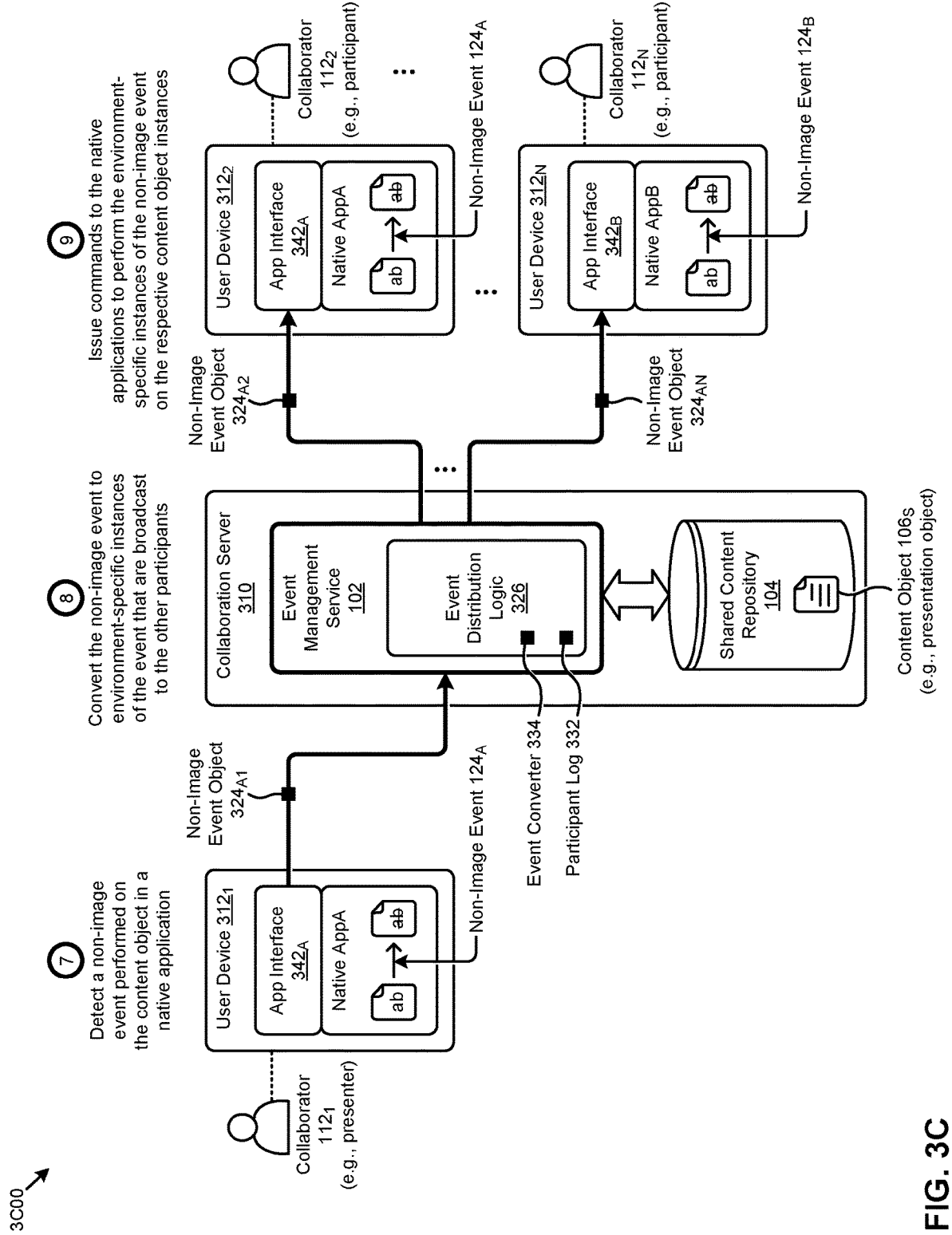
FIG. 3C illustrates a heterogeneous native application event processing environment for implementing real-time content object presentation using non-image events, according to an embodiment.

FIG. 3C illustrates a heterogeneous native application event processing environment 3C00 for implementing real-time content object presentation using non-image events. As an option, one or more variations of native application event processing environment 3C00 or any aspect thereof may be implemented in the context of the architecture and functionality of the embodiments described herein. The native application event processing environment 3C00 or any aspect thereof may be implemented in any scenario.

The embodiment shown in FIG. 3C depicts various collaborators (e.g., collaborator $112_1$, collaborator $112_2$, ..., collaborator $112_N$) participating in a live presentation, as facilitated by the herein disclosed techniques, of content object $106_S$ (e.g., presentation object) from shared content repository 104 at collaboration server 310.

As shown, each collaborator is managing an instance of the presentation object using various native applications at their respective user devices. Specifically, native application A (e.g., native appA) is running on user device $312_1$ and user device $312_2$, and native application B (e.g., native appB) is running on user device $312_N$. Further, to support the herein disclosed techniques, instances of an application interface (e.g., app interface $342_A$ and app interface $342_B$) are implemented to interface with the respective native applications. Specifically, the application interfaces serve to detect non-image events at the native applications and to issue commands to native applications to perform certain non-image events.

For example, non-image event $124_A$ (e.g., a text deletion event) performed on the instance of the content object at user device $312_1$ might be detected by app interface $342_A$ (operation 7). The detected non-image event (e.g., non-image event $124_A$) is received (e.g., in non-image event object $324_{A1}$) at event management service 102 and converted to application-specific or environment-specific instances of the non-image event (operation 8) that are broadcast to the other participants (e.g., in non-image event object $324_{A2}$ and non-image event object $324_{AN}$). As shown in the embodiment of FIG. 3C, an event converter 334 at event distribution logic 326 might consult participant log 332 to determine the application type of the participants, and then map the detected non-image event to environment-specific instances of the detected non-image event that have been broadcast to each of the participants. Commands are then issued to the native applications to perform the respective environment-specific instances of the non-image event on the respective content object instances (operation 9).

For example, application-specific commands are issued to native appA on user device $312_2$ to create an environment-specific instance (e.g., non-image event $124_A$) of the detected non-image event (e.g., non-image event $124_A$). In this case, the environment-specific instance and the detected instance are the same as they are both associated with the same native application (e.g., native appA). Commands are also issued to native appB on user device $312_N$ to create an environment-specific instance (e.g., non-image event $124_B$) of the detected non-image event (e.g., non-image event $124_B$).

Any sets of non-image events can be recorded in log files such as participant log files or event log files. In some cases an event log file can be distributed at a time later than the end of the session to be replayed in an alternative environment. Strictly as one example, during a session, non-image events can be recorded in a log file and formatted to be replayed through a native application such as Microsoft WORD or Microsoft POWERPOINT.

Figure 4A:
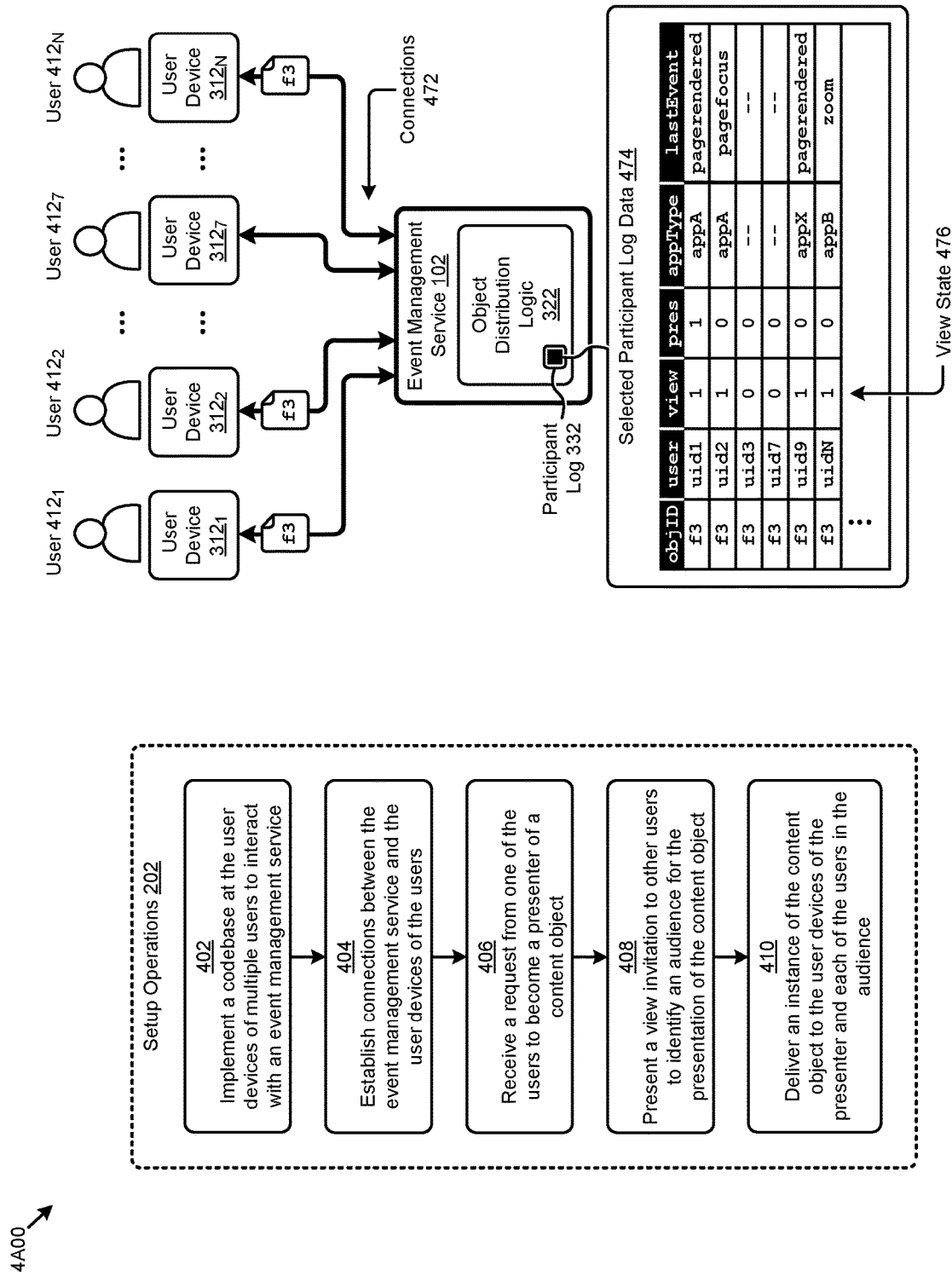
FIG. 4A presents a content object distribution technique as implemented in systems that facilitate real-time content object presentation using non-image events, according to an embodiment.

A detailed embodiment of setup operations that facilitate real-time content object presentation using non-image events according to the herein disclosed techniques is shown and described as pertains to FIG. 4A.

FIG. 4A presents a content object distribution technique 4A00 as implemented in systems that facilitate real-time content object presentation using non-image events. As an option, one or more variations of content object distribution technique 4A00 or any aspect thereof may be implemented in the context of the architecture and functionality of the embodiments described herein. The content object distribution technique 4A00 or any aspect thereof may be implemented in any environment.

Content object distribution technique 4A00 presents one embodiment of certain steps and/or operations that facilitate distribution of a content object in systems that implement real-time content object presentation using non-image events. Various illustrations are also presented to illustrate content object distribution technique 4A00. Further, specialized data structures designed to improve the way a computer stores and retrieves data in memory when performing steps and/or operations pertaining to content object distribution technique 4A00 are also shown in FIG. 4A.

As can be observed, content object distribution technique 4A00 can represent a detailed embodiment of setup operations 202 earlier presented and described as pertaining to FIG. 2. Content object distribution technique 4A00 can commence by implementing a codebase at the user devices of multiple users to interact with an event management service (step 402). Connections between the user devices and the event management service are then established (step 404). For example, and as shown, a set of connections 472 (e.g., Web Socket connections) might be established between event management service 102 and multiple user devices (e.g., user device $312_1$, user device $312_2$, ..., user device $312_7$, ..., user device $312_N$) of a respective set of users (e.g., user $412_1$, user $412_2$, ..., user $412_7$, ..., user $412_N$). A request from one of the users (e.g., user $412_1$) to become a presenter of a content object (e.g., file "f3") is received (step 406). Upon receiving the request to present, a view invitation is presented to the other users to identify an audience for the presentation of the content object (step 408). For example, the view invitation might be an alert and/or a "View" button that is displayed at the user device of each user who is online and authorized to access the presented content object.

An instance of the content object is delivered to the presenter and each of the users in the audience (step 410). In the shown example, an instance of file "f3" is delivered to user $412_1$ (e.g., the presenter), user $412_2$ (e.g., a participant in the audience), and user $412_N$ (e.g., a participant in the audience). In certain embodiments, a set of object distribution logic 322 is implemented at event management service 102 to facilitate content object distribution technique 4A00. Specifically, object distribution logic 322 might access a participant log 332 to determine the recipients for a certain content object (e.g., presentation object). The data comprising participant log 332 can be organized and/or stored using various techniques. As shown, in a set of selected participant log data 474, participant log 332 associates various collaborator attributes to a particular content object (e.g., presentation object). Selected participant log data 474 indicates data of participant log 332 might be organized and/or stored in a tabular structure (e.g., relational database table) that has rows corresponding to a particular content object and columns corresponding to the attributes of the collaborators for that content object. As another example, participant log 332 might be organized and/or stored in a programming code object that has instances corresponding to a particular content object and properties corresponding to the various collaborator attributes pertaining to that content object.

In any case, as depicted in selected participant log data 474, a particular set (e.g., table row or object instance) of collaborator attributes might describe a content object identifier (e.g., stored in an "objID" field), a user identifier (e.g., stored in a "user" field), a view state indicator (e.g., stored in a "view" field), a presenter state indicator (e.g., stored in a "pres" field), a client application (e.g., content object viewer application, native application, etc.) identifier (e.g., stored in an "appType" field), a description of the last detected event on the instance of the content object associated with the user (e.g., stored in a "lastEvent" field), and/or other collaborator attributes. In the shown embodiment, the view state 476 of a particular user is set to a viewing state (e.g., the user is viewing a presentation of the content object) when "view=1" and set to a non-viewing state (e.g., the user is not viewing the presentation of the content object) when "view=0". Further, a particular user is established as the presenter when "pres=1" and is not the presenter when "pres=0". Using selected participant log data 474 and/or other information, object distribution logic 322 can determine that "uid1", "uid2", "uid9", and "uidN" desire to participate in the presentation of the content object (e.g., with "uid1" as the presenter), and are to receive a copy of the content object file "f3" to be presented.

Figure 4B:
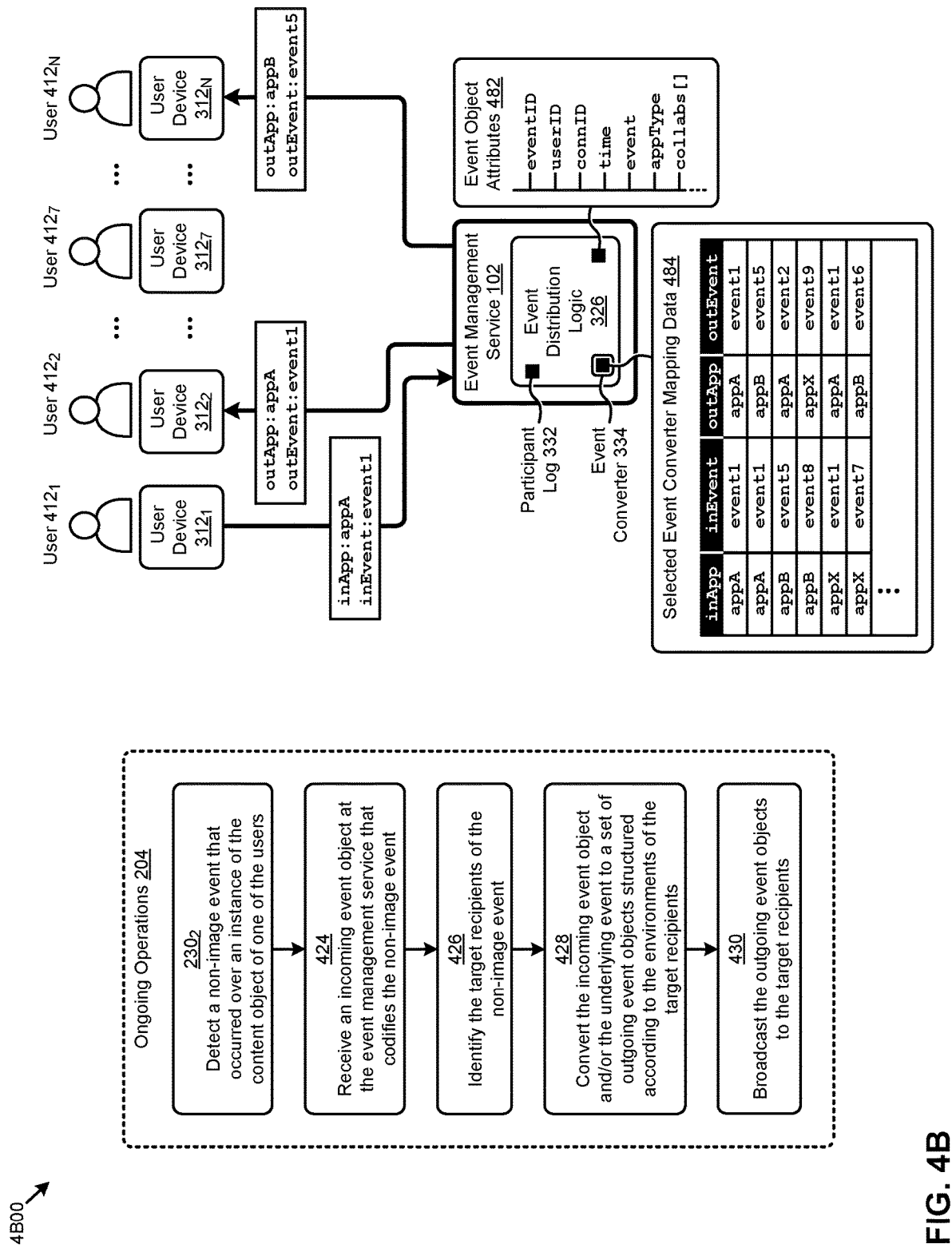
FIG. 4B presents a non-image event processing technique as implemented in systems that facilitate real-time content object presentation using non-image events, according to an embodiment.

A detailed embodiment of ongoing operations that facilitate real-time content object presentation using non-image events according to the herein disclosed techniques is shown and described as pertains to FIG. 4B.

FIG. 4B presents a non-image event processing technique 4B00 as implemented in systems that facilitate real-time content object presentation using non-image events. As an option, one or more variations of a non-image event processing technique 4B00 or any aspect thereof may be implemented in the context of the architecture and functionality of the embodiments described herein. The non-image event processing technique 4B00 or any aspect thereof may be implemented in any environment.

Non-image event processing technique 4B00 presents one embodiment of certain steps and/or operations that facilitate processing of non-image events in systems that implement real-time content object presentation using non-image events. Various illustrations are also presented to illustrate non-image event processing technique 4B00. Further, specialized data structures designed to improve the way a computer stores and retrieves data in memory when performing steps and/or operations pertaining to non-image event processing technique 4B00 are also shown in FIG. 4B. As can be observed, non-image event processing technique 4B00 can represent a detailed embodiment of ongoing operations 204 earlier presented and described as pertaining to FIG. 2.

Non-image event processing technique 4B00 can commence by detecting a non-image event that occurred over an instance of the content object of one of the users participating in a presentation of the content object (step $230_2$). As illustrated, the non-image event might have occurred at any of the user devices (e.g., user device $312_1$, user device $312_2$, . . . , user device $312_N$) of the users (e.g., user $412_1$, user $412_2$, . . . , user $412_N$) participating in the presentation of the content object. In continuing the example introduced in FIG. 4A, user $412_7$ at user device $312_7$ is not participating in the presentation of the content object (e.g., not viewing, and not presenting), thus as shown, user $412_7$ at user device $312_7$ does not need to receive content objects (e.g., file "f3") or corresponding events.

An incoming event object that codifies the detected non-image event is received at event management service 102 (step 424). Such event objects (e.g., non-image event objects) comprise data records that characterize certain attributes pertaining to a certain event (e.g., non-image event). The data records comprising the event objects can be organized and/or stored using various techniques. For example, the event attributes of an event object might be organized and/or stored in a tabular structure (e.g., relational database table) that has rows corresponding to a particular event and columns corresponding to various attributes pertaining to that event. As another example, the event attributes of an event object might be organized and/or stored in a programming code object that has instances corresponding to a particular event and properties corresponding to the various attributes pertaining to that event. In any case, as depicted in event object attributes 482, a particular set (e.g., table row or object instance) of event attributes might describe an event identifier (e.g., stored in a "eventID" field), a user identifier of a user associated with the event (e.g., stored in a "userID" field), a connection identifier of a user device (e.g., stored in a "connID" field), a timestamp (e.g., stored in a "time" field), an event description (e.g., stored in an "event" field), a client application (e.g., content object viewer application, native application, etc.) identifier (e.g., stored in an "appType" field), a list of presentation participants (e.g., collaborators) associated with the event (e.g., stored in a "collabs[ ]" object), and/or other event attributes.

The target recipients to receive the non-image event are identified (step 426). For example, the target recipients might include any participants in a presentation that did not invoke the detected non-image event. In some embodiments, event distribution logic 326 at event management service 102 can consult participant log 332 to determine the target recipients. The incoming event object and/or the underlying non-image event is converted to a set of outgoing event objects (e.g., non-image event objects) that are structured according to the environments of the target recipients (step 428) and then broadcast to the target recipients (step 430). For example, the detected non-image event might be converted to environment-specific instances of the non-image event based in part on a then-current view of the content object, a native application implemented to manage the content object, and/or other environmental conditions at the user devices of the target recipients.

In certain embodiments, an event converter 334 might be implemented to determine certain environmental attributes (e.g., an application type) of the target recipients (e.g., presentation participants), and then map the detected non-image event to environment-specific instances of the detected non-image event that are broadcast to each of the target recipients. More specifically, event converter 334 might have access to certain mapping data, such as shown in the selected event converter mapping data 484, to facilitate mapping the detected non-image event to environment-specific instances of the detected non-image event. As shown, selected event converter mapping data 484 maps a combination of an incoming application type (e.g., stored in an "inApp" field) and incoming event (e.g., stored in an "inEvent" field) to an outgoing event (e.g., stored in an "outEvent" field) for a particular outgoing application type (e.g., stored in an "outApp" field). The incoming event and application type might correspond to the detected non-image event and the application type at which it was detected, and the outgoing event and application type might correspond to the environment-specific instance of the detected non-image event and the application type of the target recipient at which the environment-specific event is to be applied.

As illustrated in the specific example of FIG. 4B, the incoming event object from user device $312_1$ specifies an "inApp" of "appA" and an "inEvent" of "events". According to selected event converter mapping data 484, the foregoing incoming information is converted to an "outEvent" of "events" to perform on "appA" of user device $312_2$, and an "outEvent" of "events" to perform on "appB" of user device $312_N$. In some cases the difference between a first app (e.g., "appA") and a second app (e.g., "appB") is a version difference, such as "APP v1.A" as being different from "APP v1.B". In some cases the difference between a first app (e.g., "appA") and a second app (e.g., "appB") is a difference of vendor and/or author and/or operating system, such as "VendorA's PDF Reader for Windows" as being different from "VendorB's PDF reader for Linux". A representative list of non-image navigation events and associated characteristics are presented in Table 1. Other non-image document presentation and/or manipulation events, including additional reviewing and navigation events, document editing events, and myriad other document manipulation events are possible.

TABLE 1

Representative non-image reviewing and navigation events

| Object Type | Event | Description | Data Type |
|---|---|---|---|
| Media | ratechange | Media speed changes | <string: playback speed> |
| Media | volumechange | Media volume changes | <number: volume level> |
| Media | play | Media is played | <Boolean: playing/not playing> |
| Media | pause | Media is paused | <Boolean: paused/not paused> |
| Media | seeked | Media skips to a time | <number: time> |
| Document | zoom | View zooms in/out | <number: zoom value> |
| Document | pagerendered | Page is rendered | <number: page number> |
| Document | pagefocus | Page is visible | <number: page number> |
| Document | scrollstart | Scroll starts | <tuple: top/left view position> |
| Document | scrollend | Scroll ends | <tuple: top/left view position |
| Image | zoom | View zooms in/out | <number: zoom value> |
| Image | pan | View is panning | <Boolean: panning/not panning> |
| Image | panstart | Panning started | <Boolean: panning started/not started> |
| Image | panend | Panning ended | <Boolean: panning ended/not ended> |
| Image | rotate | View is rotated | <number: degrees rotated> |

Figure 5A:
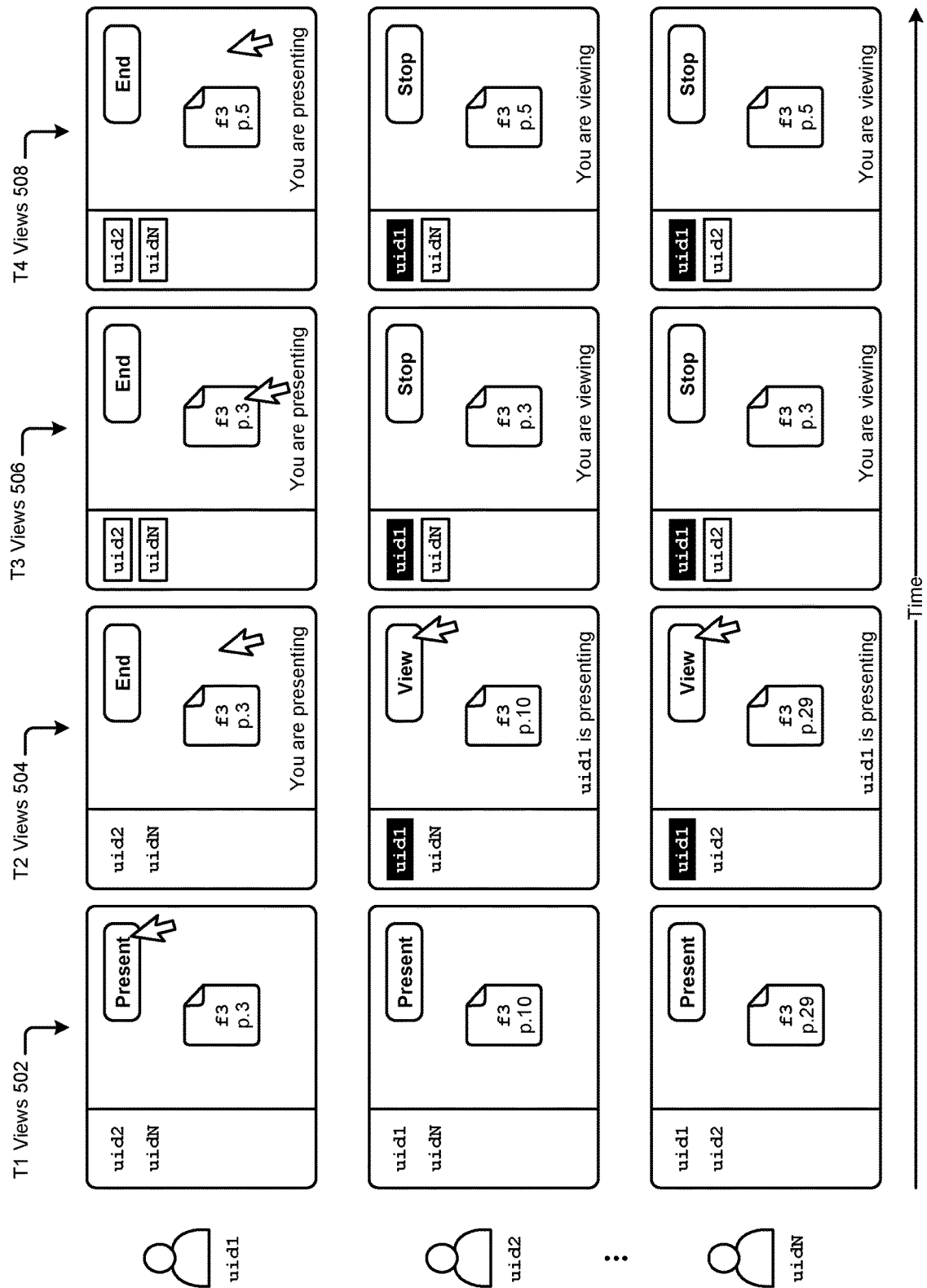
FIG. 5A and FIG. 5B illustrate user interaction scenarios as implemented in systems that facilitate real-time content object presentation using non-image events, according to an embodiment.
Figure 5B:
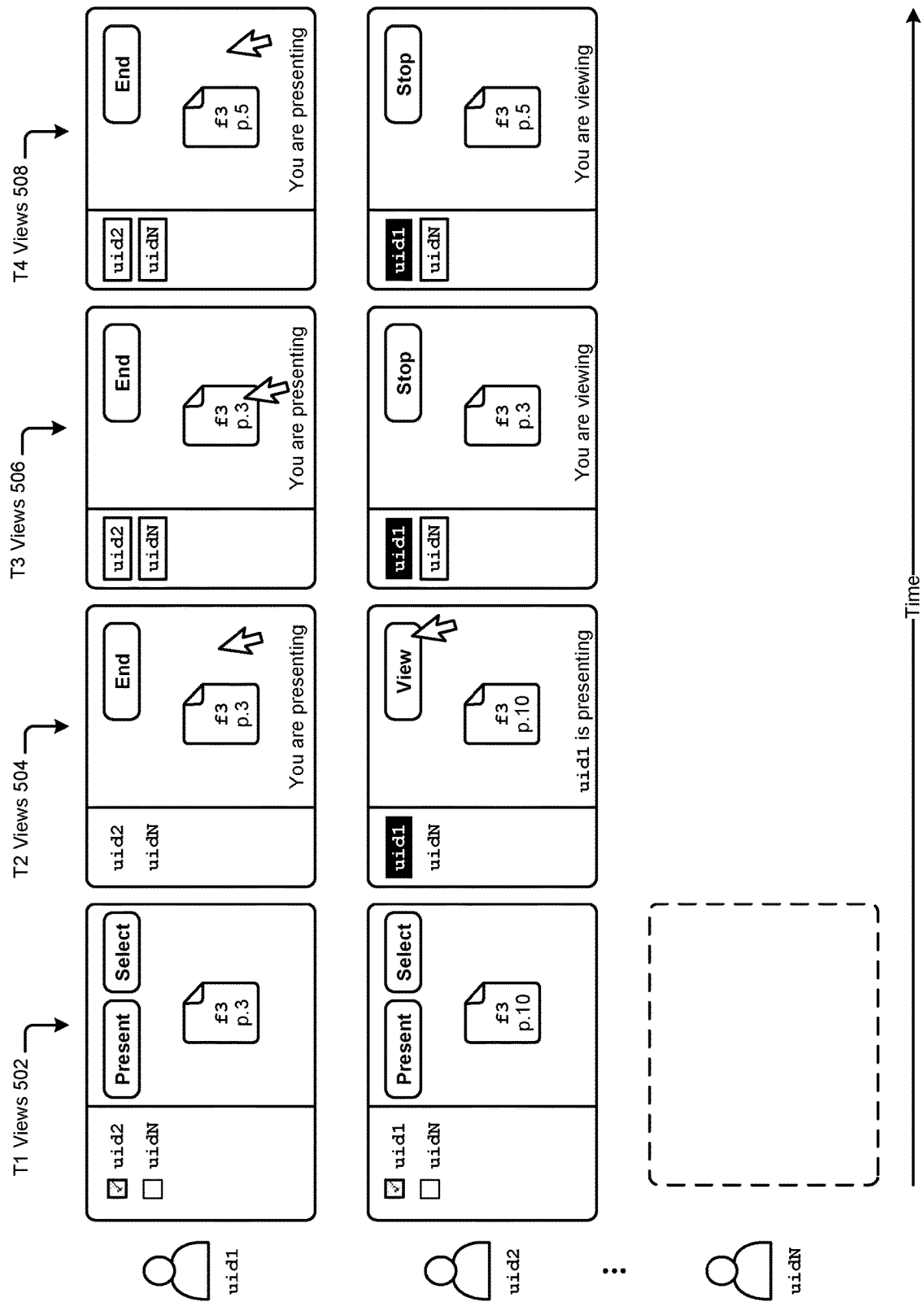

Several example user interaction scenarios as implemented in systems that facilitate the herein disclosed techniques are presented and discussed as pertaining to FIG. 5A and FIG. 5B.

FIG. 5A and FIG. 5B illustrate user interaction scenarios as implemented in systems that facilitate real-time content object presentation using non-image events. As an option, one or more variations of the user interaction scenarios or any aspect thereof may be implemented in the context of the architecture and functionality of the embodiments described herein. The user interaction scenarios or any aspect thereof may be implemented in any environment.

The embodiment shown in FIG. 5A is merely one example of a time sequence of user interface views (e.g., T1 views 502 at time T1, T2 views 504 at time T2, T3 views 506 at time T3, and T4 views 508 at time T4) for a set of user (e.g., user "uid1", user "uid2", . . . , user "uidN") participating in a presentation of a content object as facilitated by the herein disclosed techniques. As illustrated in T1 views 502, each user is viewing an instance of a content object (e.g., file "f3") that has been distributed to the respective user devices of the users. At time T1, each of the users are viewing different pages (e.g., "p. 3", "p. 10", and "p. 29") of file "f3". The respective views presented to the users also show the other users viewing file "f3" (e.g., in the left side pane of the views). A "Present" button is also rendered to facilitate a request by any of the users to become a presenter of file "f3". In this example user interaction scenario, user "uid1" clicks the "Present" button to invoke a presentation of file "f3" so as to become the presenter.

Referring to T2 views 504, user "uid1" is now the presenter, and can end the presentation at any time by clicking the "End" button. The left side pane of the views of users "uid2" and "uidN" also indicate that user "uid1" is presenting (e.g., as indicated by the highlighted user identifier) and a "View" button is rendered as a "view invitation" to join the presentation. As illustrated, both user "uid2" and user "uidN" accept the view invitation by selecting the "View" button.

In T3 views 506, the rendered pages of user "uid2" and user "uidN" update in real-time to the page (e.g., "p. 3") selected by user "uid1". The box around the user identifiers in the views indicate that a particular user is participating in the presentation as a non-presenting participant. The participants are also offered a "Stop" button to stop viewing the presentation at any time. In certain embodiments, clicking a "View" button will set a view state for a particular user to a viewing state, and clicking a "Stop" button will set the view state to a not viewing state.

As depicted in T4 views 508, if user "uid1" navigates to page 5 (e.g., "p. 5") from page 3, the rendered pages of the respective instances of the content object (e.g., file "f3") at all the other participants will update in real time, as facilitated by the herein disclosed techniques.

In the embodiment shown in FIG. 5A, the act of one user clicking on the "Present" button serves to suppress the display of any other "Present" button options from being displayed to a user, thus effectively "locking out" other users from also becoming a presenter. However, in other embodiments, there can be multiple users that self-identify as a presenter, such as whenever the "Present" button is not suppressed. In such cases a second or Nth user can click on the "Present" button to become a second or Nth presenter. In such a situation, the event management service can perform logic over contemporaneously performed actions by the multiple presenters so as to reduce or eliminate actual or apparent conflicts.

In some cases, the logic being performed over the contemporaneously performed actions might be permissive (e.g., allowing any events from multiple presenters to be broadcast, regardless of determination of actual or apparent conflicts) while, in other cases, the logic being performed over the contemporaneously performed actions might be restrictive (e.g., so as to avoid actual or apparent conflicting actions to be taken). In still other cases, user events are selectively suppressed (or not) based on a presenter priority indication. In some cases, a user interface allows multiple users to present, and a corresponding user interface is shown to collaborating non-presenter users. This allows a user to elect to follow a particular presenter when multiple users indicated their intent to present. Control for such variations in the user interface can be characterized and stored as predetermined and/or user-settable priority or precedence preferences. In still other cases, logic being performed over the contemporaneously performed actions might be based on priority or precedence rules that are applied to users and/or to actions and/or to sequences of actions.

In some embodiments, a participant is presented a user interface that aids in selecting an audience. Specifically, and as shown in FIG. 5B, a user interface includes a "Present" button, a "Select" button and checkboxes. The "Present" button operates as heretofore described. The "Select" button and the checkboxes provide a user interface mechanism for a user to select-in users. In some cases, the users listed on the left panel are populated from a then-current set of users whom are accessing the shared content. In other cases, the users listed on the left panel are populated from a set of users who had previously been assigned into one or more collaboration groups that interact with the particular shared content object.

In cases where users are populated based on an a priori defined collaboration group, even when a selected-in (e.g., via a checked checkbox) user is not at that moment accessing or interacting with the shared content, an alert can be sent to the selected-in users. In some cases, as shown, it can happen that at a time after a presenter has self-elected and selected-in users, some users might not be selected-in. As such, it is possible to "lock-out" a user from joining the presentation session.

More specifically, if and when such a "locked-out" user does decide to initiate interaction with the particular shared content object, that user would not receive an invitation to join the session. More specifically, if and when that "locked-out" user does interact with the shared content object, that user does not receive any indication to join the session, neither does that "locked-out" user receive any indication that there is a session in progress. Any document presentation events performed by users who are not participating in the session are not delivered to any users in the session; rather, such document presentation events are suppressed from reaching other user devices.

A session object data structure can be formed whenever a new session is invoked by a presenter. The session object can be used for routing of non-image events originating from the user devices of the presenters on that session. Specifically, such non-image events originating from the user devices of the presenters in a particular session can be routed only to the audience members of that session. Furthermore, the session object can be used for managing alerts and user interface I/O (input/output or IO) that pertain to the participants subsumed by the session. In some situations, there can be multiple sessions over the same shared content object in operation at any moment in time. Any of the foregoing routing and/or session management functions can be implemented in whole or in part by an instance or instances of the aforementioned event distribution logic.

In still further situations, a presenter might avail of a variety of methods to alert and select-in a group of users. In one example, a hyperlink can be sent to a candidate collaborator, and clicking on such a hyperlink at the user device of the candidate collaborator brings the user to an access point of the shared content object. The applicable user interface is presented to the candidate user and, based on the election by the user (e.g., as a presenter or as a viewer), the act of the election automatically adds the user to the session. The foregoing technique can be implemented in whole or in part by displaying a user interface that includes an integration with alternative technologies and/or alternative models of collaboration such as are facilitated by "Slack channels", and/or by "Google email group lists", and/or by texting (e.g., iMessage texting), and/or by chat channels, and/or using any third-party messaging technologies. Invited participants can self-elect to join the session. As such, the listing of then-current users as shown in the user interfaces of FIG. 5A and FIG. 5B can change at any time (e.g., whenever the participant constituency changes).

Figure 6:
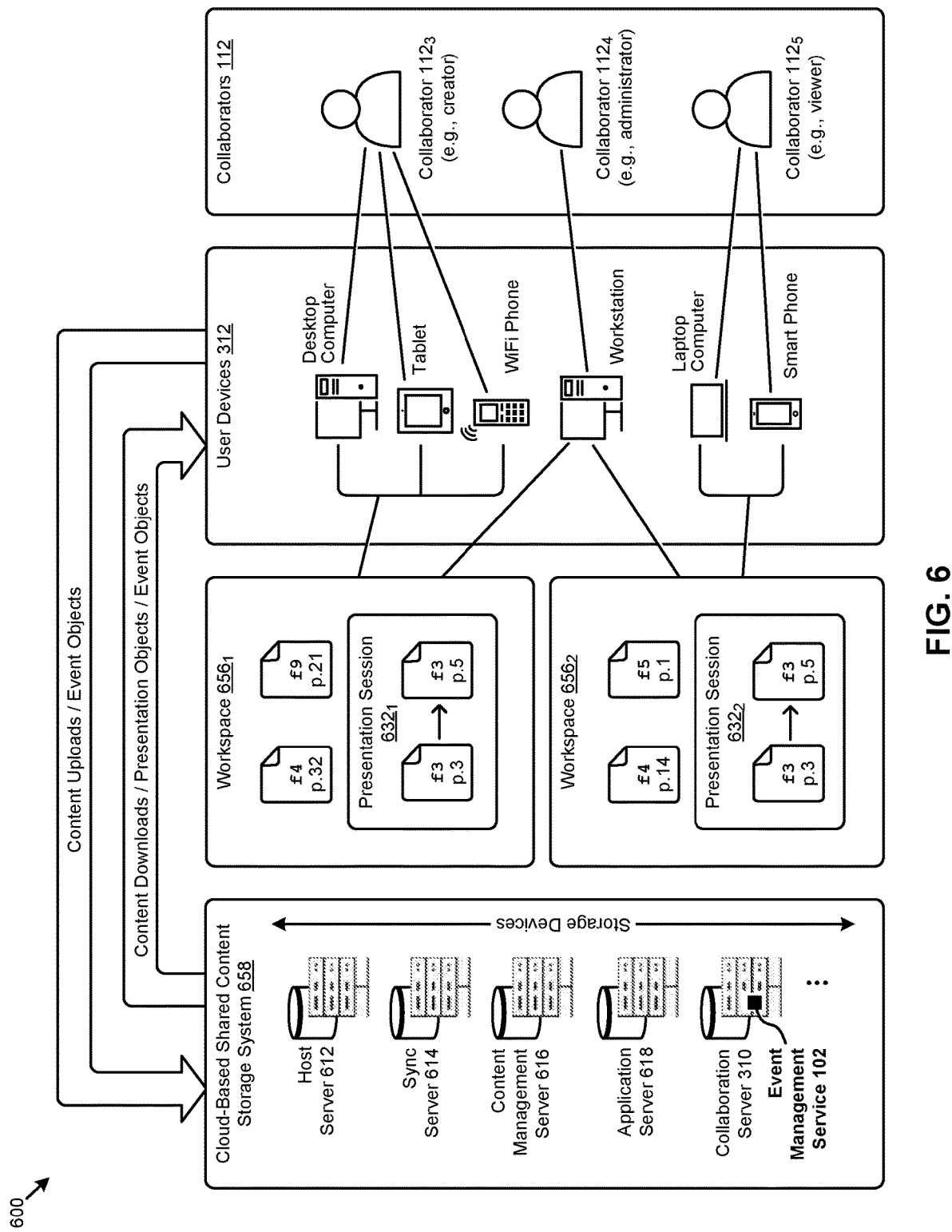
FIG. 6 depicts a cloud-based environment for implementing real-time content object presentation using non-image events, according to an embodiment.

Further details pertaining to implementing the herein disclosed techniques in a cloud-based environment are described and shown as pertaining to FIG. 6.

FIG. 6 depicts a cloud-based environment 600 for implementing real-time content object presentation using non-image events. As an option, one or more variations of cloud-based environment 600 or any aspect thereof may be implemented in the context of the architecture and functionality of the embodiments described herein. Cloud-based environment 600 or any aspect thereof may be implemented in any scenario.

As shown in FIG. 6, certain users (e.g., collaborators 112) having various collaboration roles (e.g., creator, editor, administrator, approver, auditor, reviewer, etc.) can use one or more instances of user devices 312 to interact with one or more workspaces (e.g., workspace $656_1$, workspace $656_2$, etc.) facilitated by a cloud-based shared content storage system 658 in cloud-based environment 600. As an example, collaborator $112_3$ might be a content creator (e.g., content object presenter) with access to workspace $656_1$, collaborator $112_5$ might be a content viewer (e.g., presentation participant) with access to workspace $656_2$, and collaborator $112_4$ might be an administrator with access to both workspaces. The workspaces can be stored in any location, and are at least partially maintained by components within cloud-based shared content storage system 658. Cloud-based shared content storage system 658 supports any variety of processing elements and/or servers such as host server 612, sync server 614, content management server 616, application server 618, collaboration server 310 comprising an instance of event management service 102, and/or other processing elements. Cloud-based shared content storage system 658 further facilitates access by the foregoing processing elements to any variety of storage devices.

Any of the users can be provisioned authorized access to various portions the content objects stored in the storage devices without the additional process of manually downloading and storing a file locally on an instance of user devices 312 (e.g., a desktop computer, a tablet, a WiFi phone, a workstation, a laptop computer, a smart phone, etc.). For example, one of the content objects (e.g., file "f4") created and uploaded by collaborator $112_3$ might be viewed by collaborator $112_5$ without informing collaborator $112_5$ where the file is physically stored in the storage devices of cloud-based shared content storage system 658. Such a facility streamlines the frequently repeated sharing and/or collaboration processes.

More specifically, the aforementioned workspaces can facilitate real-time content object presentation using non-image events. For example, collaborator $112_3$ might initiate a presentation of file "f3" to an audience comprising collaborator $112_5$. According to the herein disclosed techniques, such a presentation session is facilitated by a distribution of instances of file "f3" from cloud-based shared content storage system 658 to user devices 312, and an exchange of event objects codifying certain non-image events between cloud-based shared content storage system 658 and user devices 312. As shown, instances of the presentation session (e.g., presentation session $632_1$ and presentation session $632_2$) are viewed at the workspaces of the collaborators participating in the presentation.

Additional Embodiments of the Disclosure

Additional Practical Application Examples

Figure 7:
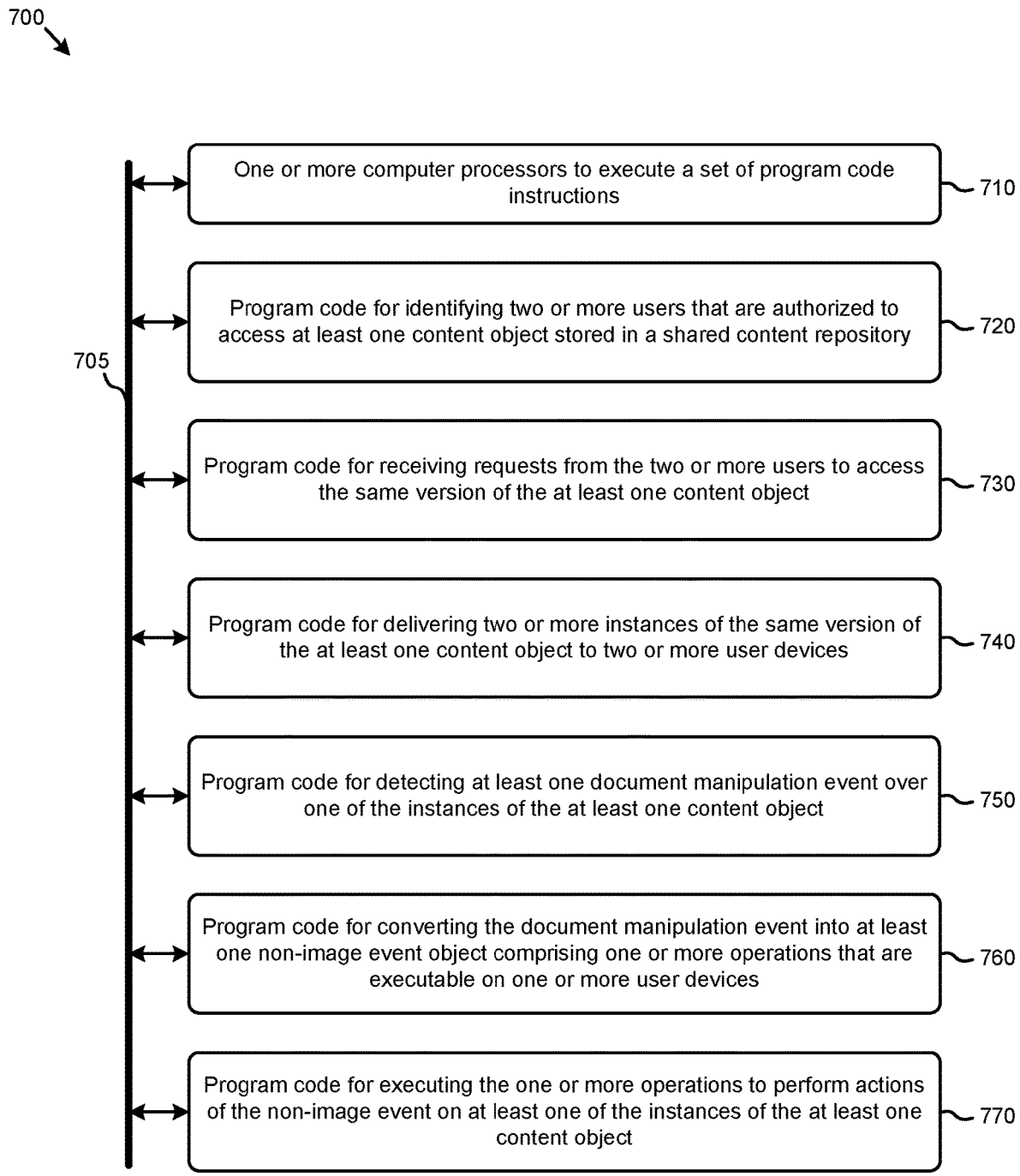
FIG. 7 depicts system components as an arrangement of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address efficient live presentation of content objects to multiple audience members. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: identifying two or more users that are authorized to access at least one content object stored in a shared content repository (module 720); receiving requests from the two or more users to access a same version of the at least one content object (module 730); delivering two or more instances of the same version of the at least one content object to two or more user devices (module 740); detecting at least one document manipulation event over one of the instances of the at least one content object (module 750); converting the document manipulation event into at least one non-image event object comprising one or more operations that are executable on one or more user devices (module 760); and executing the one or more operations to perform actions of the non-image event on at least one of the instances of the at least one content object (module 770).

Variations of the foregoing may include more or fewer of the shown modules. Certain variations may perform more or fewer (or different) steps, and/or certain variations may use data elements in more, or in fewer (or different) operations.

System Architecture Overview

Additional System Architecture Examples

Figure 8A:
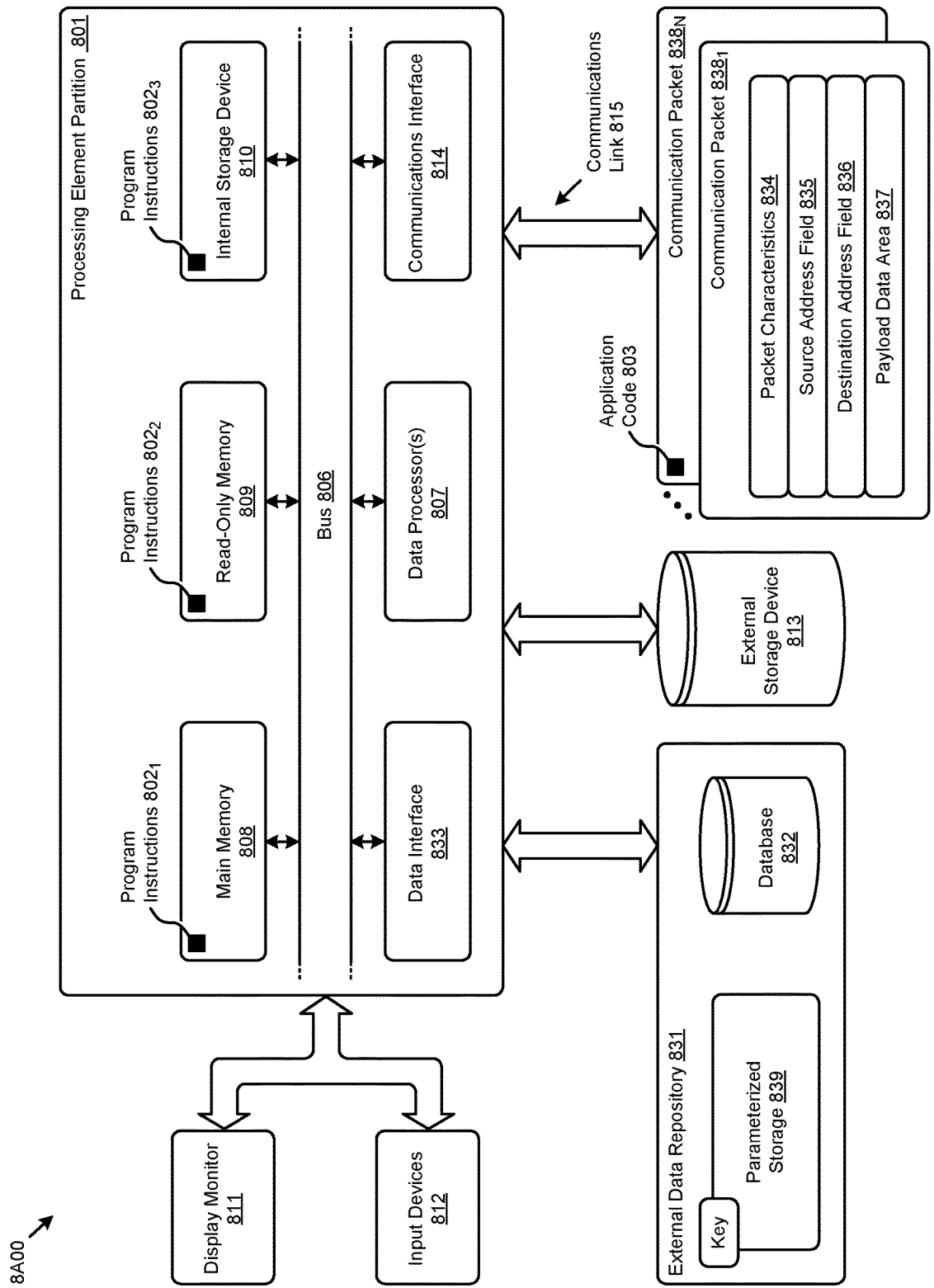
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to real-time content object presentation using non-image events. A module may include one or more state machines and/or combinational logic used to implement or facilitate the operational and/or performance characteristics pertaining to real-time content object presentation using non-image events.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of real-time content object presentation using non-image events). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to real-time content object presentation using non-image events, and/or for improving the way data is manipulated when performing computerized operations pertaining to exchanging non-image events between collaborators that are applied to respective collaborator-specific instances of a shared content object.

Figure 8B:
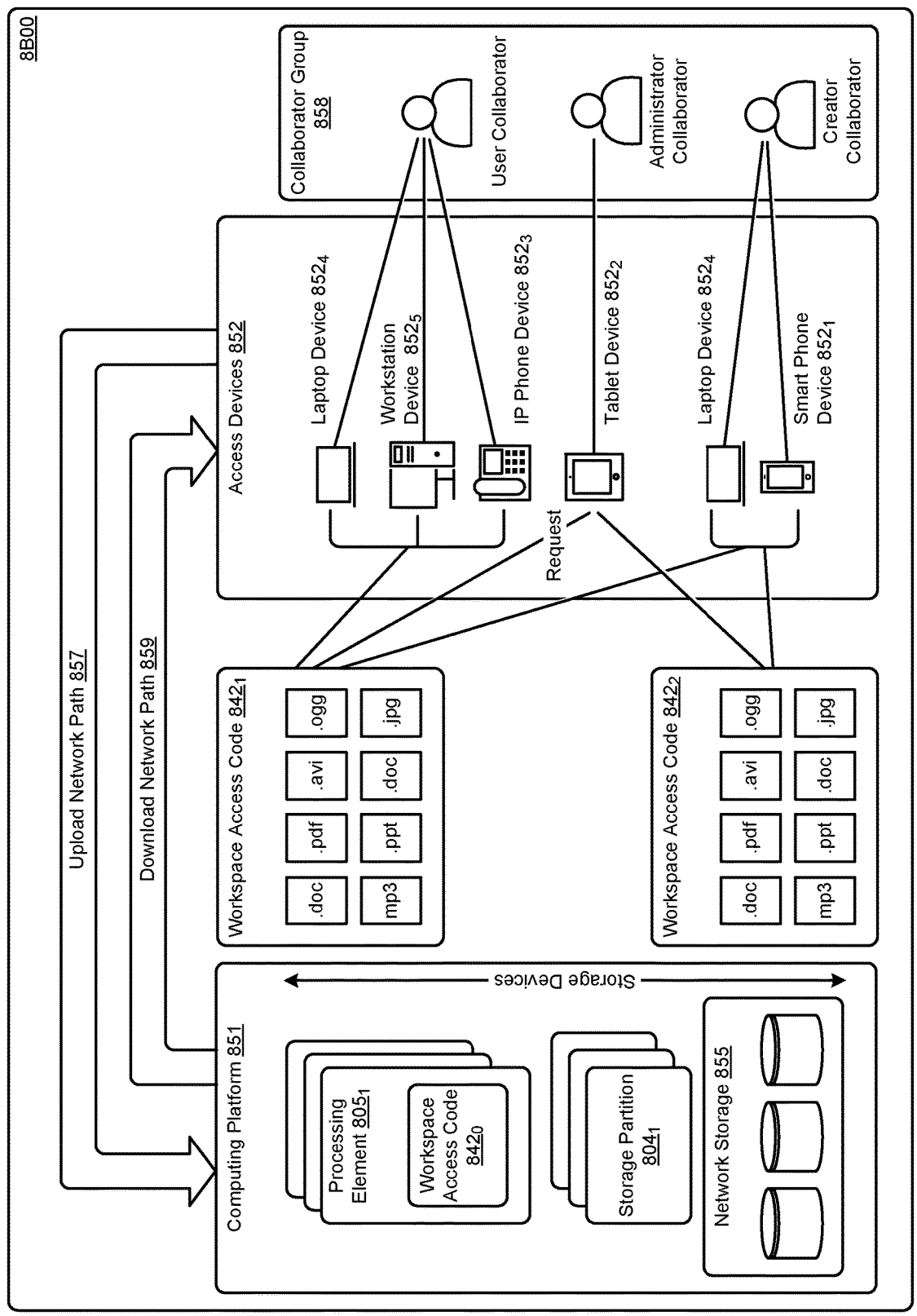

FIG. 8B depicts a block diagram of an instance of a cloud-based environment 8B00. Such a cloud-based environment supports access to workspaces through the execution of workspace access code (e.g., workspace access code 842$_0$, workspace access code 842$_1$, and workspace access code 842$_2$). Workspace access code can be executed on any of the shown access devices 852 (e.g., laptop device 852$_4$, workstation device 852$_5$, IP phone device 852$_3$, tablet device 852$_2$, smart phone device 852$_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element 805$_1$). The workspace access code can interface with storage devices such as the shown networked storage 855. Storage of workspaces and/or any constituent files or objects, and/or any other code or scripts or data can be stored in any one or more storage partitions (e.g., storage partition 804$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    identifying two or more users that are authorized to access a content object stored in a shared content repository;
    processing requests to access a content object;
    delivering two or more editable instances of a same copy of the content object to two or more user devices of the two or more users for performing a collaboration on the content object, the collaboration corresponding to each user of the two or more users manipulating a respective editable local instance of the content object on a respective user device of the two or more user devices to perform a document manipulation operation over the content object, the two or more instances corresponding to copies of the content object, wherein a first instance associated to a first user is at a first location of the content object and a second instance associated to a second user is at a second location that is different than the first location;
    designating the first user as a presenter and the second user as a non-presenting participant that is following the presenter, wherein the second instance of the second user is updated to display the second instance to the second user at the first location upon the designation of the second user as the non-presenting participant;
    detecting a non-image event over the first instance of the content object of the first user, the non-image event corresponding to an action performed by the first user at a third location of the content object within the first instance, the third location being different than the first location and the second location; and
    broadcasting the non-image event to a user device of the second user to navigate the second instance from the first location to the third location of the content object to display to the second user the action performed by the first user at the third location, wherein the broadcasting of the non-image event comprises converting the non-image event into a non-image event object comprising one or more operations that are executable on one or more user devices of respective users following the presenter, wherein the action performed by the presenter is displayed on the one or more devices of the respective users via the one or more operations that are executed on respective instances of the content object on the one or more user devices.

2. The method of claim 1, wherein converting the non-image manipulation event into the non-image event object comprises converting the non-image manipulation event to an application-specific representation of the non-image manipulation event.

3. The method of claim 2, wherein the application-specific representation of the non-image manipulation event is delivered to a previewer application.

4. The method of claim 2, wherein the one or more operations to perform actions of the non-image manipulation event are derived from at least one of, a then-current view of the content object, or an application-specific command that is performed over the content object.

5. The method of claim 1, wherein a user interface is provided to identify a user that takes on a presenter role that directs actions taken over the content object.

6. The method of claim 5, wherein the user interface includes a selects-in mechanism to identify users to bring into a session as a participant.

7. The method of claim 6, further comprising suppressing events performed by users who are not participating in the session.

8. The method of claim 5, wherein the user interface includes an integration with one or more third-party messaging technologies.

9. The method of claim 1, wherein at least one of, delivering at least one of the instances of the content object, or broadcasting the non-image manipulation event to at least one of the other participants, is based at least in part on a view state.

10. The method of claim 9, wherein the view state indicates at least one of, a viewing state, a presenting state, or a non-viewing state.

11. The method of claim 1, further comprising an act of a log in to the shared content repository to receive authorization to access the content object.

12. The method of claim 1, wherein the non-image manipulation event is recorded in a log.

13. The method of claim 1, wherein the action is an edit of the content object performed at the first instance by the first user, wherein the content object is edited based at least in part on the edit performed by the first user on the first instance of the content object.

14. The method of claim 1, further comprising receiving a non-image manipulation event from a second one of the two or more user devices.

15. The method of claim 14, wherein the non-image manipulation event is suppressed based at least in part on a presenter priority indication.

16. A computer readable medium, embodied in a non-transitory computer readable medium, the non-transitory computer readable medium having stored thereon a sequence of instructions which, when stored in memory and executed by one or more processors causes the one or more processors to perform a set of acts for forming and hosting live presentation sessions by broadcasting non-image events that are performed over shared content objects, the acts comprising:
    identifying two or more users that are authorized to access a content object stored in a shared content repository;
    processing requests to access a same version of the content object;

delivering two or more editable instances of a same copy of the content object to two or more user devices of the two or more users for performing a collaboration on the content object, the collaboration corresponding to each user of the two or more users manipulating a respective editable local instance of the content object on a respective user device of the two or more user devices to perform a document manipulation operation over the content object, the two or more instances corresponding to copies of the content object, wherein a first instance associated to a first user is at a first location of the content object and a second instance associated to a second user is at a second location that is different than the first location;

designating the first user as a presenter and the second user as a non-presenting participant that is following the presenter, wherein the second instance of the second user is updated to display the second instance to the second user at the first location upon the designation of the second user as the non-presenting participant;

detecting a non-image event over the first instance of the content object of the first user, the non-image event corresponding to an action performed by the first user at a third location of the content object within the first instance, the third location being different than the first location and the second location; and broadcasting the non-image event to a user device of the second user to navigate the second instance from the first location to the third location of the content object to display to the second user the action performed by the first user at the third location, wherein the broadcasting of the non-image event comprises converting the non-image event into a non-image event object comprising one or more operations that are executable on one or more user devices of respective users following the presenter, wherein the action performed by the presenter is displayed on the one or more devices of the respective users via the one or more operations that are executed on respective instances of the content object on the one or more user devices.

17. The computer readable medium of claim 16, wherein converting the non-image manipulation event into the non-image event object comprises converting the non-image manipulation event to an application-specific representation of the non-image manipulation event.

18. The computer readable medium of claim 17, wherein the application-specific representation of the non-image manipulation event is delivered to a previewer application.

19. A system for forming and hosting live presentation sessions by broadcasting non-image events that are performed over shared content objects, the system comprising:
a non-transitory storage medium having stored thereon a sequence of instructions; and
one or more processors that execute the instructions to cause the one or more processors to perform a set of acts, the acts comprising, identifying two or more users that are authorized to access a at least one content object stored in a shared content repository;

processing requests to access a same version of the content object;

delivering two or more editable instances of a same copy of the content object to two or more user devices of the two or more users for performing a collaboration on the content object, the collaboration corresponding to each user of the two or more users manipulating a respective editable local instance of the content object on a respective user device of the two or more user devices to perform a document manipulation operation over the content object, the two or more instances corresponding to copies of the content object, wherein a first instance associated to a first user is at a first location of the content object and a second instance associated to a second user is at a second location that is different than the first location;

designating the first user as a presenter and the second user as a non-presenting participant that is following the presenter, wherein the second instance of the second user is updated to display the second instance to the second user at the first location upon the designation of the second user as the non-presenting participant;

detecting a non-image event over the first instance of the content object of the first user, the non-image event corresponding to an action performed by the first user at a third location of the content object within the first instance, the third location being different than the first location and the second location; and broadcasting the non-image event to a user device of the second user to navigate the second instance from the first location to the third location of the content object to display to the second user the action performed by the first user at the third location, wherein the broadcasting of the non-image event comprises converting the non-image event into a non-image event object comprising one or more operations that are executable on one or more user devices of respective users following the presenter, wherein the action performed by the presenter is displayed on the one or more devices of the respective users via the one or more operations that are executed on respective instances of the content object on the one or more user devices.

20. The system of claim 19, wherein converting the non-image manipulation event into the non-image event object comprises converting the non-image manipulation event to an application-specific representation of the non-image manipulation event.

* * * * *